United States Patent
Kunysz et al.

(10) Patent No.: US 7,460,615 B2
(45) Date of Patent: Dec. 2, 2008

(54) SPATIAL AND TIME MULTIPLEXING OF MULTI-BAND SIGNALS

(75) Inventors: Waldemar Kunysz, Calgary (CA); Patrick C. Fenton, Calgary (CA)

(73) Assignee: NovAtel, Inc., Calgary, Alberta (CA)

( * ) Notice: Subject to any disclaimer, the term of this patent is extended or adjusted under 35 U.S.C. 154(b) by 585 days.

(21) Appl. No.: 11/104,058

(22) Filed: Apr. 12, 2005

(65) Prior Publication Data

US 2006/0227905 A1 Oct. 12, 2006

(51) Int. Cl.
*H03K 9/00* (2006.01)

(52) U.S. Cl. .................. 375/316; 375/260; 375/149; 455/285; 455/1; 342/357.12; 342/352; 342/357.09

(58) Field of Classification Search .............. 375/260, 375/149; 342/357.12, 357.09, 352, 18; 455/285, 455/1
See application file for complete search history.

(56) References Cited

U.S. PATENT DOCUMENTS

| | | | | |
|---|---|---|---|---|
| 4,485,383 A | * | 11/1984 | Maher | 342/352 |
| 5,101,416 A | | 3/1992 | Fenton et al. | |
| 5,678,169 A | * | 10/1997 | Turney | 455/1 |
| 6,016,121 A | * | 1/2000 | Bogensberger et al. | 342/357.12 |
| 6,069,584 A | * | 5/2000 | Johnson | 342/357.09 |
| 6,140,958 A | * | 10/2000 | Johnson et al. | 342/357.09 |
| 6,639,541 B1 | * | 10/2003 | Quintana et al. | 342/18 |
| 6,954,488 B1 | * | 10/2005 | Lennen | 375/149 |
| 2005/0259760 A1 | * | 11/2005 | Casabona et al. | 375/260 |
| 2006/0141969 A1 | * | 6/2006 | Dubash et al. | 455/285 |
| 2006/0152408 A1 | * | 7/2006 | Leinonen et al. | 342/357.12 |

OTHER PUBLICATIONS

Fenton, et al., "NovAtel's GPS Receiver: The High Performance OEM Sensor of the Future", NovAtel Communications Ltd., Canada, and AJ Systems, California, ION GPS-91, Sep. 1991, pp. 1-10.

Kunysz, Waldemar, "Advanced Pinwheel Compact Controlled Reception Pattern Antenna (AP-CRPA) Designed for Interference and Multipath Mitigation", ION Conference, Sep. 2001, 7 pages.

* cited by examiner

*Primary Examiner*—Sudhanshu C Pathak
(74) *Attorney, Agent, or Firm*—Cesari and McKenna, LLP (57) ABSTRACT

A multi-band receiver for use with satellite ranging systems is provided. The receiver has a simplified architecture in which input signals of various frequencies are multiplexed together to form a single composite analog signal. In accordance with one embodiment of the invention, this composite signal only requires a single RF circuit for down conversion to an intermediate frequency. The composite, downconverted signal is sampled, and the digitized samples are demultiplexed to form digital counterparts of the original signals from each frequency band. An embodiment for use with elements of a phased array antenna is also provided.

16 Claims, 10 Drawing Sheets

SPATIAL AND TIME MULTIPLEXING OF MULTI-BAND SIGNALS

BACKGROUND OF THE INVENTION

1. Field of the Invention

This invention relates generally to satellite ranging system receivers.

2. Background Information

There are a number of satellite ranging systems that are currently deployed and additional systems are to be deployed in the near future. Each of these configurations is based upon transmission of ranging signals in particular frequency bands. More specifically, the present United States Global Positioning System (GPS) is based on transmission of ranging signals in two frequency bands known as L1, which is at a center frequency of 1575.42 MHz and L2, centered at 1227.6 MHz. To enhance the reliability and availability of this system, additional GPS signal structures are planned (e.g. L5, L2C). In addition, other satellite ranging systems are being deployed or have been deployed such as that of the Russian Federation, i.e., GLONASS (with two signal structures: G1 and G2), and the European GALLILEO system with multiple signal structures (referred to herein as: E1, E2 . . . E5, etc.)

The system satellites transmit precisely timed signals that contain a number of components, namely, a plurality of pseudo-random noise (PRN) codes and data. The signals allow for precise determination of latitude, longitude, elevation and time. The systems use a digital receiver, which receives PRN-encoded signals. A PRN ranging system receiver essentially synchronizes local versions of the transmitted codes to the received codes and operates by using time difference of arrival and Doppler measurement techniques to produce pseudoranges for the satellites then in view. The receiver then determines its global position using the pseudoranges.

Each satellite transmits on at least one carrier frequency that is modulated with low frequency (typically 50 hertz) digital data, which consists of information such as the satellite ephemeris, (i.e. position, current time of day, and system status information.) As noted, a satellite ranging signal receiver receives a composite signal consisting of one or more of the signals transmitted by the satellite within view (within a direct line of sight) as well as noise and interfering signals. Currently, there are 24 GPS satellites orbiting the Earth in 12-hour orbits. By determining the transmission time from at least four satellites and knowing each satellite's ephemeris, and approximate time of day information, the receiver can calculate the pseudoranges and thus its three-dimensional position, its velocity and the precise time of day.

A receiver typically downconverts the received satellite signal to an intermediate frequency (IF) signal before the signal is converted from an analog signal to a digital signal. At a downconverter stage, the input radio frequency (RF) signal from the antenna is first amplified and filtered and then down converted to the IF signal. The down conversion can be performed by "heterodyning," which involves mixing the incoming signal with one or more locally generated carrier reference signals to produce the signal with a selected intermediate frequency (IF). This analog IF signal is then converted to digital samples by an A/D converter.

In a conventional receiver, there is a separate downconverter stage for each carrier frequency band of interest. Thus, in most typical designs, each respective downconverter stage includes at least one RF band pass filter component that filters out signals that are not within the desired frequency band, a heterodyning mixer, and an associated local oscillator that produces a carrier that has the frequency required to produce the desired IF signal after mixing with the received carrier. The downconverter stage further includes and various other amplifiers and filters. Coupled with these components is an A/D converter. Accordingly, in known designs, all of these components are needed for each frequency band signal structure being received and processed by the receiver. For example, one downconverter stage is needed for the L1 portion of an incoming GPS signal and a separate downconverter stage is required for the L2 portion of the incoming signal. This adds complexity and bulk to the electronic circuits of the GPS receiver.

As noted, there are several different satellite transmission systems and more are planned for the future. Each of these transmission systems transmits signals in two or more different frequency bands. Thus, in accordance with conventional designs, in order for a single receiver to obtain and use signals from multiple satellite systems, a separate downconverter stage has been required for the respective frequency bands. Thus, similar to the GPS environment just discussed, this duplication of circuitry adds to the cost, complexity and size of the receiver, as the circuitry requires greater area on integrated circuits in the receiver.

There remains a need, therefore, for a satellite ranging signal receiver of an architecture which is of an acceptable size and cost, and which accommodates multiple signal bands at a nominal increase in receiver complexity.

A GPS receiver may also incorporate a Controlled Reception Pattern Antenna (CRPA) for removal or processing of intentional and unintentional jamming signals. The CRPA includes a phased array that has multiple antenna elements, and information from each antenna element is used for forming the beam. At present a separate RF channel circuit is needed for obtaining and using the signal from each antenna element. The RF channels consist of filters, low noise amplifiers, mixers, variable controlled oscillators and AGC circuits. However, many such arrays include seven or more antenna elements. This results in a rather complex and large analog hardware section for an associated receiver for such a system.

There remains a need, therefore, a receiver architecture for use with a CRPA antenna, which uses less space than prior designs and involves a significantly reduced mutual coupling effect between antenna elements.

SUMMARY OF THE INVENTION

The disadvantages of prior techniques are overcome by the present invention, which provides a number of improved architectures for use with satellite ranging system receivers. The architecture of each receiver is simplified in order to reduce complexity and to decrease the amount of space required on the integrated circuits that contain the receiver electronics.

A first embodiment of the invention is a multiplexed single analog/dual frequency GPS receiver. Briefly, current GPS configuration is based on transmission of ranging signals in two frequency bands (L1 and L2). An inventive receiver uses a single down conversion stage to convert both to a desired IF frequency, and a single A/D converter to obtain digital samples. This is an improvement over current receivers, in which the L1 and L2 signals are each separately downconverted using a separate downconversion circuit for each incoming signal in each frequency band, and a sampled train of data is obtained for each downconverted signal using a dedicated A/D converter such that the digital section of the receiver receives a separate sampled train of data for each signal passed from its respective A/D converter.

This is simplified in accordance with the present invention in that the sampling of each signal is performed in a more efficient manner. As will be understood by those skilled in the art, each analog signal is typically sampled at its Nyquist rate. This sampling rate results in dead periods in between samples. In accordance with the present invention, the dead periods between samples of one signal are used for obtaining samples of a second signal of another frequency. Thus, more than one signal can be sampled during a given time period. Using this sampling rate allows the signals to be multiplexed into a composite signal such that a single A/D converter can be used. The A/D converter obtains samples from the composite by obtaining a sample of the L1 portion of the composite signal at a first time, and then at a second sample time, the A/D converter obtains samples of the L2 portion of the signal.

More specifically, in accordance with one embodiment of the invention, the analog signals (e.g., L1 and L2) are multiplexed in the time domain into a composite analog output signal. The time domain multiplexed composite analog signal is then passed through a single RF/IF receiver channel (downconverter) having a local oscillator that produces a carrier signal at a frequency that is half way between the two frequencies. The composite analog signal is thereby reduced to one intermediate frequency signal, which is then sampled by the A/D converter.

As discussed above, the timing for the sampling is based upon the Nyquist rate of the first signal, and with the samples of the second signal filling the dead zones between samples. The multiplexer passes the L1 signal, then the L2 signal at time intervals that are selected to correspond to the time intervals at which the samples are taken by the A/D converter. The demultiplexer then receives digital counterparts which are representative of the appropriate analog portions in order to digitally represent the two frequency band portions of the signal, separately.

It is noted that traditional architecture would have required separate down conversion circuits for each channel, i.e. one for L1, and a second circuit for L2, instead, the present invention simplifies this by using one down conversion circuit. Initially, if N analog channels are multiplexed, the receiver architecture is simplified by a factor of N minus 1 at the cost of increasing the clocking rate of the A/D converter N times.

In accordance with another embodiment of the invention, a number of signals from different satellite systems can be accommodated with a multi-band receiver having a simplified architecture. In this instance, the receiver may have as incoming signals, the L1 and L2 channels from the United States GPS system, the signals E1-E5, for example, from the European Galileo system, as well as the signals G1 and G2, etc. from the Russian GLONASS system. In accordance with the invention, all of these incoming signals are time domain multiplexed together to form a composite analog signal. The composite signal is then downconverted, sampled, and converted to digital values at corresponding times so that digital counterparts of each original signal are recovered. In accordance with this embodiment of the invention, a single high-speed A/D converter is used which provides a greatly simplified receiver.

However, when the power requirements and cost constraints of the system are such that the single high speed A/D converter is not desirable, a further embodiment of the invention includes a receiver in which the downconverted composite signal can be demultiplexed into individual, downconverted signals before the A/D conversion. Each demultiplexed signal is then passed to a sample and hold circuit, and then to a dedicated A/D converter, with appropriate delays inserted therebetween. In this way, individual digital samples are obtained for each separate signal portion from individual, slower A/D converters, and the information from the original signals is then recovered in a signal processing module.

The invention is also readily adaptable to other architectures. For example, in yet a further alternative, two or more separate down conversion circuits may be employed. In that embodiment, the frequencies within a first range are downconverted by a first stage, and a second set of signals are multiplexed and down converted in another stage, as desired in the particular application of the invention. Tunable filters pass signals having frequencies that are within a given band for each stage. Even with this modification, there is still an advantage in having less that N separate downconverter circuits in the receiver.

A further aspect of the invention relates to a GPS receiver that incorporates a controlled reception pattern antenna (CRPA), which is used for spatial filtering to remove jamming signals. In such a system, a number of antenna elements are used, and the typical number is at least 7. In a manner similar to the techniques described herein with respect to the L1, L2, E1 and E2 incoming signals, and in accordance with the present invention, the inputs from each of the antenna elements are time domain multiplexed to form a composite signal. Then, a single RF channel is used to process the composite signal. The composite signal is then sampled and reconstructed into individual digital counterparts to provide an input to a digital beam former and GPS signal processing portion of the receiver.

BRIEF DESCRIPTION OF THE DRAWINGS

The above and further advantages of the invention may be better understood by referring to the following description in conjunction with the accompanying drawings, in which.

DETAILED DESCRIPTION OF AN ILLUSTRATIVE EMBODIMENT

Figure 1:
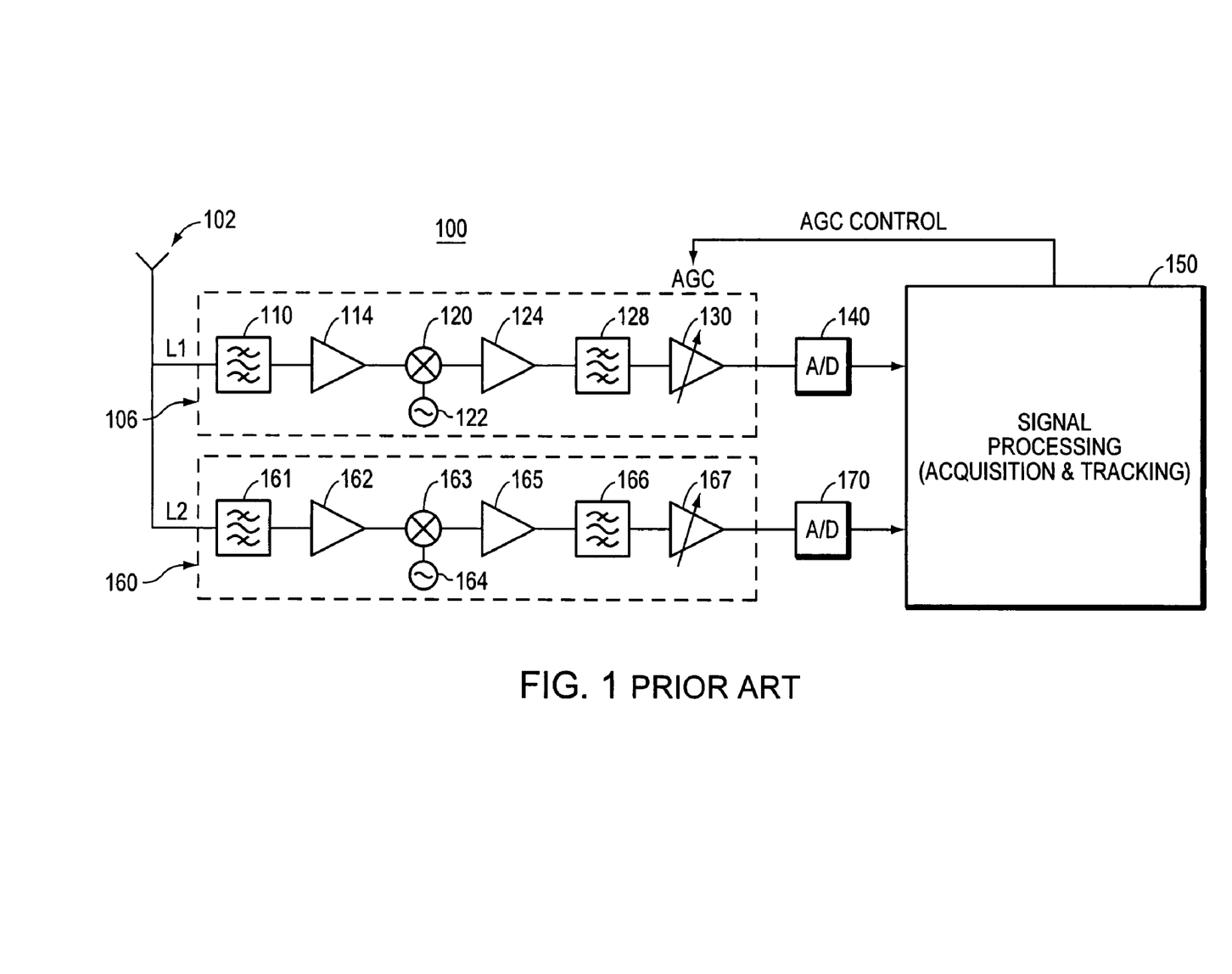
FIG. 1 is a block diagram of a prior art receiver having a traditional architecture.

FIG. 1 is a block diagram of a conventional L1/L2 heterodyne GPS receiver 100.

The receiver 100 has an antenna 102 which receives ranging signals in two frequency bands, namely the L1 and L2 bands. The L1 frequency band is associated with the downconverter stage illustrated in the dashed block 106, and is thus referred to herein as the downconverter stage 106. The downconverter stage 106 includes an RF band pass filter 110, which is a low insertion loss filter having a selected pass band centered at a desired carrier frequency. The band pass filter 110 should have a sufficiently wide range to allow several harmonics of the PRN codes to pass. The filtered signal is then passed through a low noise amplifier 114. Thereafter, heterodyning is performed using the mixer 120 which down converts the received signal from the carrier frequency to a desired intermediate frequency by mixing the received signal with a sinusoidal signal of an appropriate frequency that is produced by a local oscillator 122. Appropriate amplification is then performed by the amplifier 124. An intermediate frequency band pass filter 128 is provided having a sufficiently narrow bandwidth to remove any undesired signals, but sufficiently wide to keep the desired bandwidth. The final automatic gain control device 130 is used as a pre-amplification stage to adjust the signal strength so that it is appropriate for sampling by the A/D converter 140. Digital samples are then obtained by the sampler 140. The digital samples are passed to the signal processing circuitry 150, which acquires and tracks the L1 channel PRN codes in a known manner.

As shown in the drawing, conventional systems further require a separate down converting stage 160 for the L2 channel. This separate down converter stage 160 requires its own set of the components as in down-converter stage 106, namely a band pass filter 161 selected appropriately for the L2 frequency band as will be understood by those skilled in the art, a low noise amplifier 162, a mixer 163 with an associated local oscillator 164, an amplifier 165, an intermediate frequency filter 166, and an automatic gain control device 167. The L2 downconverter stage 160 then feeds the analog signal to the A/D converter 170 to provide digital samples of the L2 portion of the received signal. As is apparent from FIG. 1, there is thus duplication in the components in the receiver 100.

Figure 2:
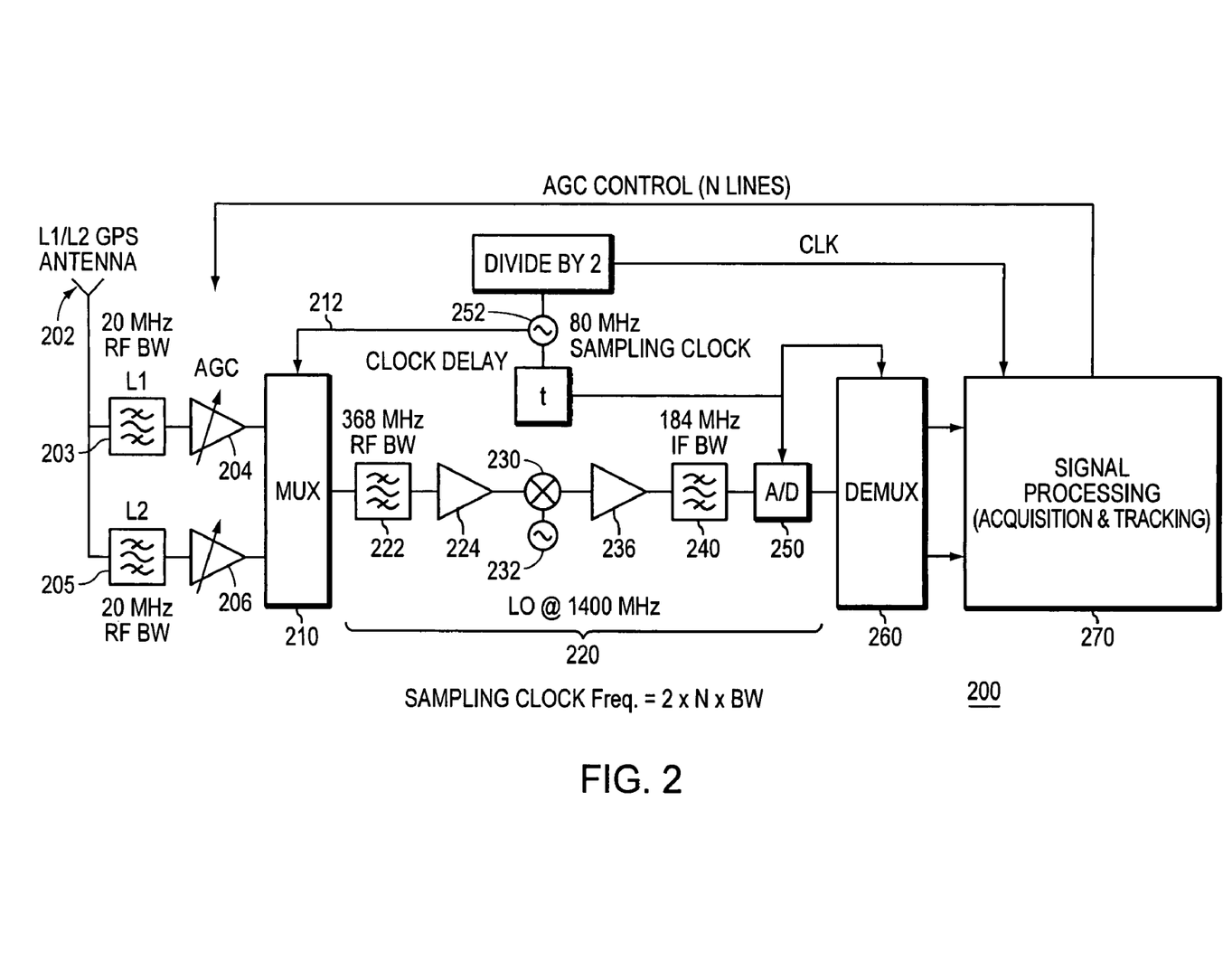
FIG. 2 is a block diagram of a multiplexed single analog/dual frequency GPS receiver in accordance with the present invention.

A solution is provided by the device of the present invention, which is illustrated in FIG. 2. FIG. 2 depicts a multiplexed single analog/dual frequency GPS receiver 200. The receiver 200 includes the antenna 202, which receives a ranging signal in two frequency bands (L1 and L2). The signals of the two frequency bands L1 and L2 are, in accordance with the present invention, multiplexed together, and the resulting composite analog signal is fed to a single downconverter stage 220, as described herein. It should be noted that for purposes of clarity of illustration only the frequency bands L1 and L2 are illustrated in FIG. 2, however, it should be understood that additional GPS signal structures are planned such as L5 and L2C in the near future and the device of the present invention is readily configurable to further provide the capacity to receive those multiple signal bands with the addition of only nominal receiver complexity. Returning to FIG. 2, the L1 band of the received signal is provided to an RF filter 203. The RF filter 203 is employed at the front end of the circuit to band limit the amount of noise entering the receiver 200, and secondly, to filter out-of-band interference and jamming signals. This front end filter 203 is used because the post-multiplexing filter 222 needs to be wide enough to accommodate both the L1 and L2 frequency band signals. As known to those skilled in the art, the L1 and L2 frequency bands are about 368 MHz apart, thus the filter 222 must be at least that wide in order to pass signals in both frequency bands. Though the filter 222 removes noise produced by the multiplexer 210, it alone is not sufficient to remove external noise, background interference and jamming signals from the incoming signals due to its being wide enough to pass both the L1 and L2 signals. Consequently, some filtering is required at the front end, and thus the front end filter 203 is used for this purpose.

Similarly, the L2 frequency band signal is fed to an RF filter 205 to band limit the amount of noise entering the receiver and to filter out-of-band interference and jamming signals, with respect to the L2 incoming signal.

The actual bandwidth chosen for the filters 203 and 205 will depend on the application of the invention, and in particular will depend upon the type of correlation being used in the application. More specifically, for high accuracy positioning, a narrow correlation is typically employed. An example of narrow correlation is described in commonly assigned U.S. Pat. No. 5,101,416, of Fenton, et al., issued on Mar. 31, 1992, which is presently incorporated herein by reference. In the case of high accuracy positioning using narrow correlation, the front end bandwidth is between about 10-20 MHz. For lower accuracy positioning, in which wide correlation is used, the front end bandwidth is between about 1-2 MHz.

The embodiment illustrated in FIG. 2 is a high accuracy positioning application in which the bandwidth (of the filters 203 and 205) is set at 20 MHz. For lower accuracy applications, the bandwidth of RF front end filters 203 and 205 is about 2 MHz. It should be understood that these values are given by way of illustration, and there may be other values that can be readily employed in other applications of the invention.

Thus the filters 203 and 205 band limit the incoming signals to substantially eliminate noise, interference and jamming signals. The filtered L1 frequency band signal is passed to an automatic gain control (AGC) device 204. Similarly, the filtered L2 signal is passed to the AGC 206. These AGC devices 204 and 206 compensate for varying signal strength by separately adjusting the signal strength of each signal to levels that (after filtering and other processing) are appropriate for the A/D converter 250, and these adjustments are controlled by a feedback signal (illustrated by the arrow 212) from the signal processing circuitry 270.

The L1 and L2 signals are next provided to multiplexer 210, which performs timed multiplexing of the analog signals. As noted, each analog signal is typically sampled at its Nyquist rate. More specifically, the L1 signal is passed to the downconverter stage 220 by the multiplexer 210, and then, subsequently (at a time which corresponds with the dead zone between the sampling of the L1 signal), the L2 portion of the signal is passed through to the single downconverter channel 220 by the multiplexer 210.

The clock signal to the multiplexer 210 is thus tied to the sampling clock 252. Specifically, the sampling clock frequency is selected to satisfy the Nyquist criteria as will be understood by those skilled in the art, in the frequency domain, and is set for the number of sampled signals in the time domain. Therefore, the minimum clock frequency is determined as:

Sampling clock frequency=$2*BW*N$

Where:

BW=Bandwidth of sampled signal

N=Number of independent, distinct analog signals

The bandwidth of the sampled signals in the example of FIG. 2 is 20 MHz. The total number of signals is 2, thus the sampling clock frequency, which also controls the multiplexer 210 is 2*20*2=80 MHz.

Under the control of this clocking signal, the multiplexer 210 produces a composite, analog signal which is fed to the single down converter stage 220, also referred to herein as an "RF/IF receiver channel 220."

The RF/IF receiver channel 220 includes the initial band pass filter 222 which is a low insertion loss filter having a pass band that includes a range of desired carrier frequencies. Specifically, the bandwidth of filter 222 is determined from the sample clock frequency and the maximum frequency separation between the different channels being passed through the receiver. In addition, the filter 222 must be wide enough to quickly settle an impulse transient response induced by the multiplexer switching mechanism. In the present example of FIG. 2, the bandwidth of the signals are 20 MHz and the sampling clock frequency is 2*20*2=80 MHz, and the separations between L1 and L2 band edges is 368 MHz, thus the filter 222 is set to 368 MHz.

The composite signal from the multiplexer 210 is passed through the filter 222 and is amplified appropriately using the low noise preamplifier 224. A mixer 230 then down converts the composite signal to a desired intermediate frequency by mixing the signal with a signal produced by a local oscillator 232. The local oscillator is selected to produce a signal that is preferably at a frequency that is approximately half way between the RF frequencies of interest, L1 and L2. The composite intermediate signal, which is thus at an IF of 184 MHz, is then amplified further using the amplifier 236 and passed through the low noise filter 240.

The IF signal, which is a multiplexed analog signal that is a composite of the incoming L1 and L2 signals, is then sampled and converted to digital values by the single A/D converter 250. A/D converter 250 is regulated by the 80 MHz sampling clock 252 with an appropriate delay 254 to account for signal propagation. The digital counterparts of the analog signal portions L1 and L2 are then demultiplexed using the demultiplexer 260. The signals provided to the demultiplexer are obtained at intervals that are also tied to the sampling clock 252, as delayed to account for signal propagation. Thus, after the signal is sampled by the A/D converter 250, the multiplexed samples are demultiplexed by demultiplexer 260 into digital representations of the analog counterparts. The counterparts are thereafter processed by the digital signal processing portion 270 for acquisition and tracking information by the receiver 200.

As shown in FIG. 2, it should be appreciated that the receiver architecture is thus simplified by using the single downconverter stage 220. The reduction in hardware involves eliminating the additional low noise amplifier, the mixer with the associated local oscillator, the amplifier, as well as the intermediate frequency filter, and particularly, the additional A/D converter, from the previous design of FIG. 1. This reduction in hardware has a cost of an increased clocking rate of the A/D converter 2 times.

Figure 3:
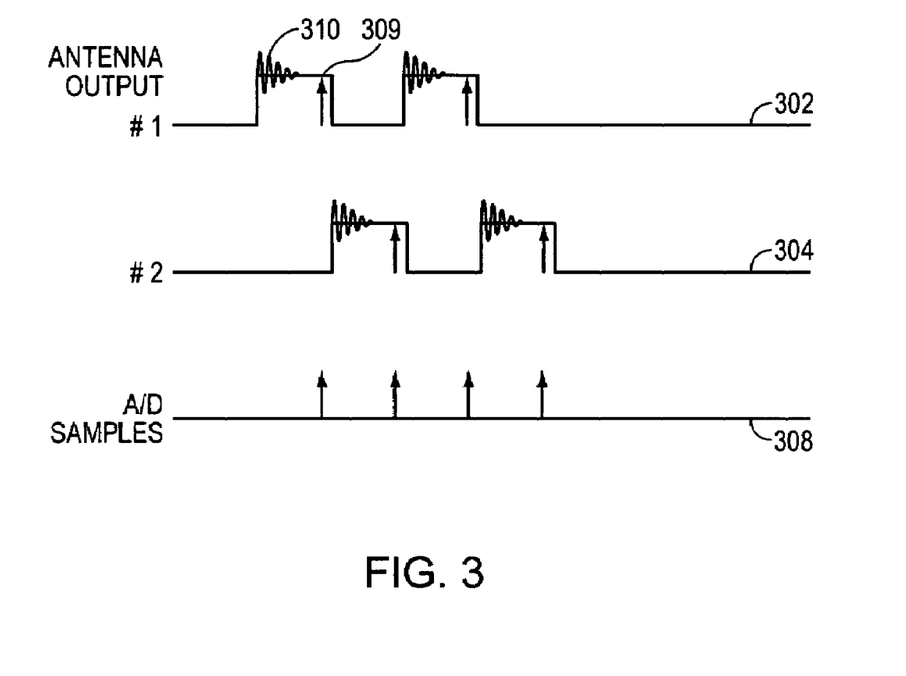
FIG. 3 is a timing diagram illustrating the parallel time domain multiplexing and sampling process for the circuit of FIG. 2.

FIG. 3 illustrates in greater detail the timing diagram for the receiver of FIG. 2. The antenna input representing the L1 signal is shown as curve 302. The L2 signal input is illustrated as curve 304. The samples are taken as shown by the arrows along the time line 308. The samples are delayed by the delay circuit 254 (FIG. 2), as described, in such a manner that the A/D samples are taken near the end 309 of the duration of each signal, in order for the signal to settle after the "ringing" (illustrated by the curve portion 310 at curve 302), which occurs just after that signal is selected by the multiplexer 210.

As noted, the incoming signals 302, 304 representing L1 and L2 respectively, are multiplexed in accordance with the predicted sampling rate. The multiplexer 210 switches the L1 signal 302 and, then the L2 signal 304 at time intervals that are selected to correspond to the time intervals at which the samples of each are to be taken by the A/D converter. The A/D converter takes the sample near the end of each pulse. The samples are alternated such that the demultiplexer will receive digital counterparts which are representative of the appropriate analog portions in the appropriate timing such that two frequency band portions of the signal can be processed, separately, and most accurately.

Figure 4:
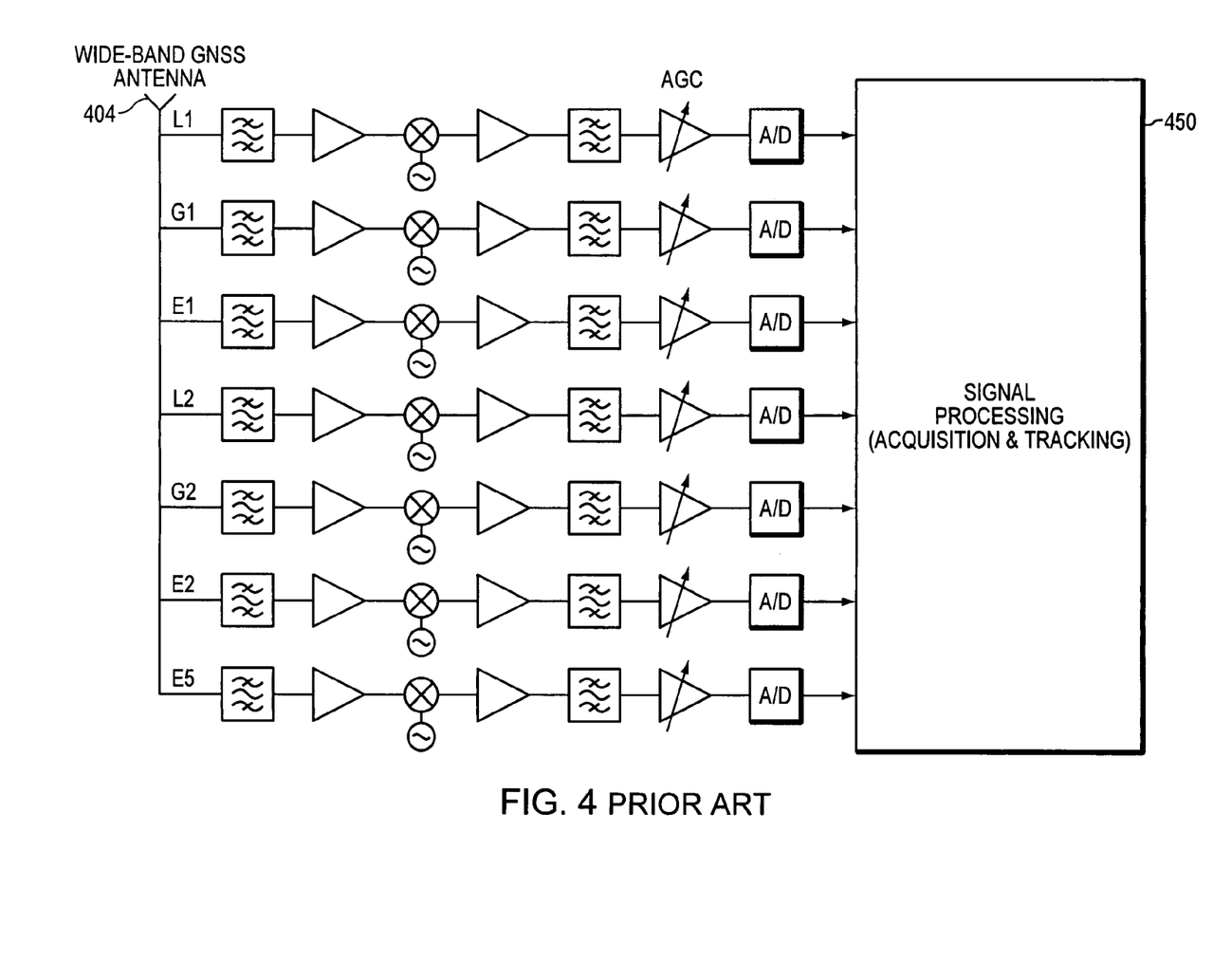
FIG. 4 is a multi-band receiver, which is used for receipt of signals from a number of different satellite ranging systems.

Referring to FIG. 4, as noted herein newer satellite ranging systems are being deployed which involve transmission of signals in multiple frequency bands. For example, the European Galileo satellite transmits frequency bands E1, E2, E5, etc. The Russian GLONASS satellite system transmits two signal structures G1 and G2. As discussed herein, the United States GPS satellite transmits two frequency bands L1 and L2. Though the frequency of the L1 band and the E1 band are essentially the same, current architecture would still require that each such signal such as L1 through E5 as illustrated in FIG. 4, that are received over a wide band Global Navigation Satellite System (GNSS) antenna 404, each requires its own RF channel downconverter stage. As is apparent from the illustration of FIG. 4, this can result in increased complexity in the receiver. Increased complexity can give rise to increased cost and a larger space requirement for receiver components. This is a disadvantage in hand held devices in which space savings are critical. In accordance with the invention, the architecture has been simplified as illustrated in FIGS. 5A and 5B.

Figure 5A:
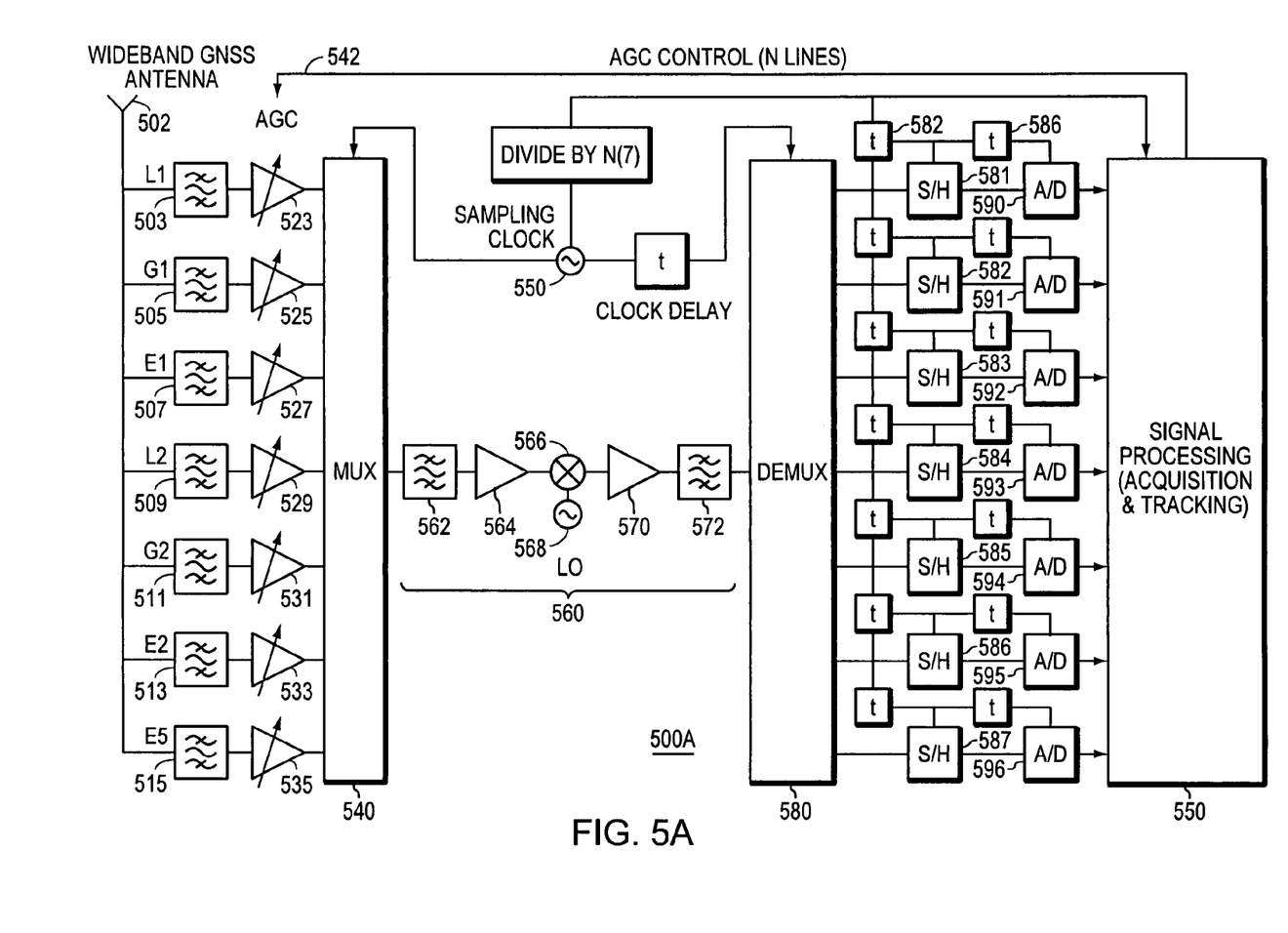
FIG. 5A is one illustrative embodiment of a simplified architecture that can be employed in accordance with the present invention.
Figure 5B:
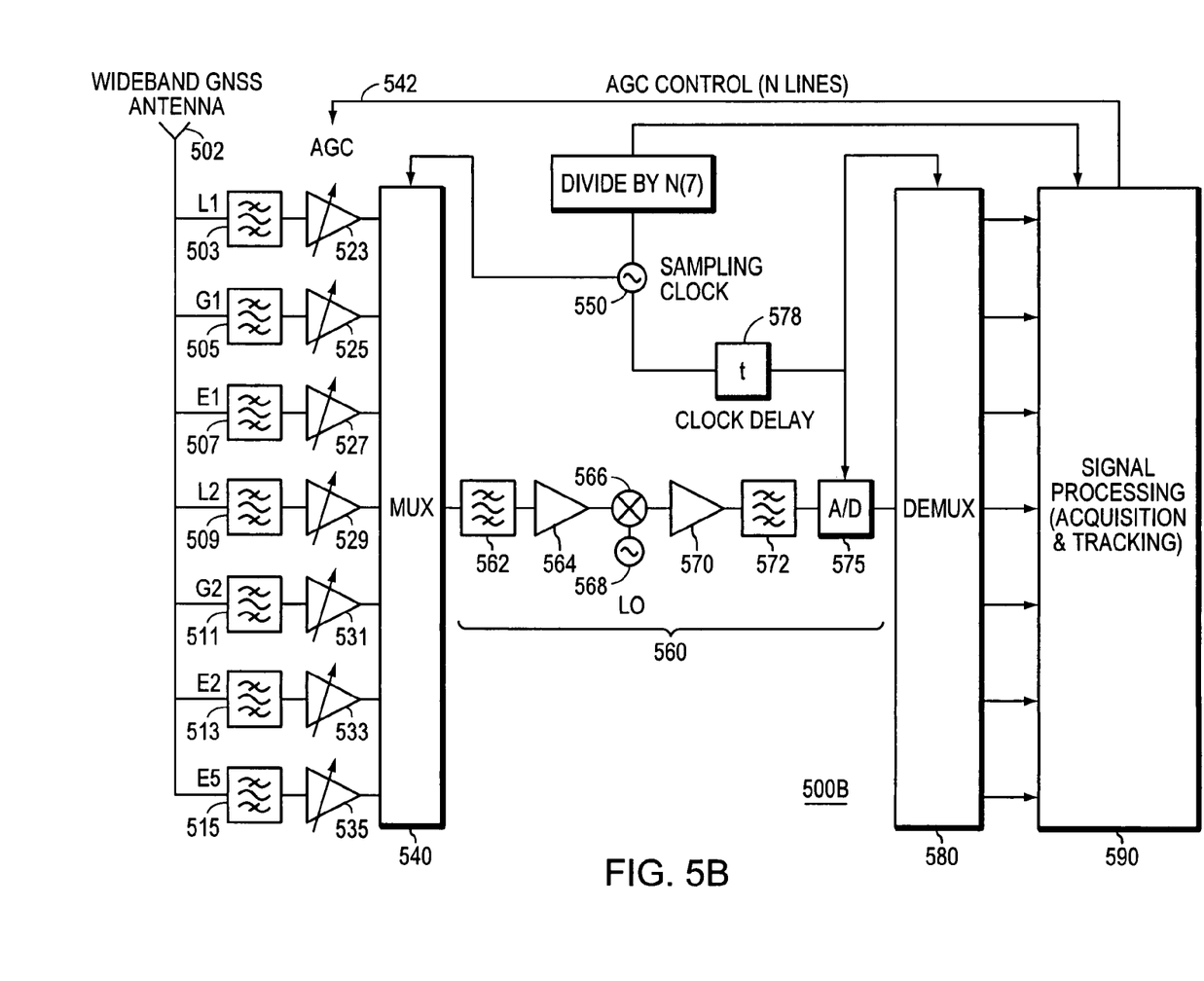
FIG. 5B is alternative illustrative embodiment of a further simplified architecture in accordance with the present invention.

In accordance with the present invention, a simplified multiband receiver 500A is provided as illustrated in FIG. 5A. The receiver 500 includes and antenna 502, which is adapted to receive multiple satellite ranging signals that are transmitted from various systems. For example, the antenna 502 receives the L1, G1, E1, L2, G2, E2, and E5 signals, as illustrated in FIG. 5A.

In accordance with the invention and in a manner similar to that described with reference to FIG. 2, each of the incoming signals is initially filtered. Thus, front end filters 503 through 515 are provided for the signals L1 through E5, respectively. These filters are employed at the front end of the circuit to band limit the amount of noise entering the receiver 500A, and secondly, to filter out-of-band interference and jamming signals. After this filtering, the L1 signal is received and provided to automatic gain control (AGC) device 523. The G1 portion is provided to at AGC 525, the E1 portion is provided to AGC 527, the L2 portion is provided to AGC 529, the G2 portion of the signal is provided to AGC 531, the E2 portion is provided to AGC 533 and the E5 is provided to AGC 535. The AGCs 523-535 are provided to compensate for varying signal strength. The signals are passed to multiplexer 540. The multiplexer produces a composite signal that is comprised of successive intervals of individual portions of each incoming signal. This composite signal is then filtered by a relatively wide band filter 562 to reduce out-of-band noise. The composite signal is appropriately amplified by the amplifier 564. A mixer 566 down converts the overall composite signal using a sinusoid provided by the local oscillator 568. The frequency of the local oscillator is selected such that the respective L1, L2 etc., signals are downconverted to signals within a selected IF band. The downconverted composite signal is amplified using the amplifier 570, and is then filtered by the filter 572 and demultiplexed using the demultiplexer 580, back into the individual analog portions.

The individual IF analog signal portions are then passed to respective sample and hold circuits prior to being sampled by associated A/D converters. A delay is added between the demultiplexer 580 and the sample and hold circuit to allow the signals to settle. A second delay is added between the sample and hold circuit and the A ID converter to allow for propagation delay at the sample and hold circuit.

More specifically, the L1 signal portion will be switched as an output from the demultiplexer 580, and will be passed to the sample and hold circuit 581. The clock sampling signal is delayed by the delay circuit 582 prior to entering the sample and hold circuit 581 to allow for the "ringing" due to the demultiplexer switching to settle. Then, the signal is held in the sample and hold circuit 581 as delayed by a second delay circuit 586 in order to used slower A/D's, clocked at N times slower than the demultiplexer 580. After this time delay, the A/D circuit 590 obtains the sample of the L1 signal and passes this digital counterpart to the digital signal processing module 580, which thereafter obtains the relevant information from the digital counterparts representative of each incoming signal, L1. A similar circuit is provided for each of the remaining signals, G1 through E5, as illustrated in FIG. 5A. This embodiment of the invention is useful in low power applications in which cost is a significant consideration. The bank of less expensive, slower A/D converters 590 through 596 with low power consumption, provides a lower cost, lower power consumption solution.

In accordance with another aspect of the present invention, a single high speed AID converter can used in a further simplified multiband GNSS receiver 500B which is illustrated in FIG. 5B. The receiver 500B has a number of the same components as the embodiment of FIG. 5A, in which case the same component is identified by the same reference character as in FIG. 5A. The receiver 500B of FIG. 5B includes an antenna 502 which receives a multiband signal which includes portions that are in a number of frequency bands including the L1, G1, E1, L2, G2, E2, and E5 frequency bands. Front end filters 503 through 515 are provided for the signals L1 through E5, respectively. These filters are employed at the front end of the circuit to band limit the amount of noise entering the receiver 500B, and secondly, to filter out-of-band interference and jamming signals. The AGCs 523 through 535 are provided to compensate for varying signal strength. The filtered signals are passed to multiplexer 540, which is controlled by the clock signal of the sampling clock 550.

The front end bandwidth in this example of FIG. 5B is 2 MHz. The total number of signals is 7, thus the sampling clock frequency, as defined herein with reference to FIG. 2, which also controls the multiplexer 540 is 2*2*7=28 MHz.

In accordance with the invention, a single downconverter circuit (RF channel) 560 is provided. The single circuit 560 includes a filter 562, which filters the composite multiplexed signal to remove noise produced by the multiplexer 540 or other unusable portions of the signal. The signal is appropriately amplified by amplifier 564. The mixer 566 mixes the fixed local oscillator (568) signal of a frequency that is chosen to be between within the overall frequency range of the incoming signals. Thus, the local oscillator 568 provides a signal, which is selected to produce IF signals within a desired band. This downconverted signal is amplified as desired using the amplifier 570 and is filtered using the filter 572. The multiplexed analog signal is then sampled by the single A/D converter 575 in accordance with sampling clock 550, with a delay introduced by the delay circuit 578, to allow for signal propagation. The samples thus obtained are provided to the demultiplexer 580, which separates the samples into the constituent L1, G1, E1, L2, G2, E2, E5, counterparts for processing in the signal processing circuitry 590, which is also under the control of the sampling clock 550 as divided by N as illustrated in FIG. 5B.

Figure 6:
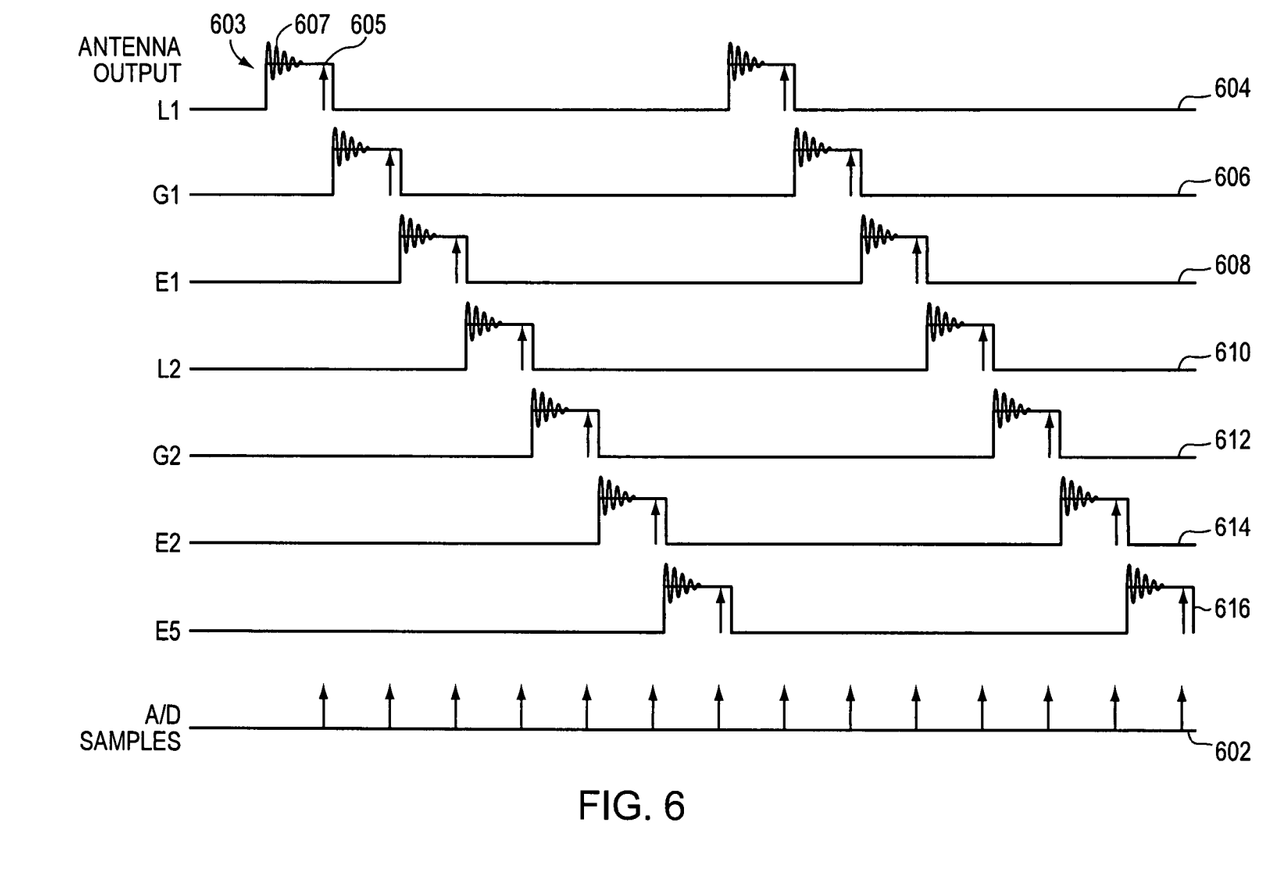
FIG. 6 is a timing diagram illustrating the parallel time domain multiplexing and sampling process for the circuit of FIG. 5A.

A timing diagram for the receiver of FIG. 5B is illustrated in FIG. 6. The A/D samples are taken at the times illustrated at the line 602. Line 604 represents the multiplexed portion of the signal from the L1 frequency band. Line 606 represents the signal from the G1 frequency band. Line 608 represents the signal of the E1 frequency band. Line 610 represents the signal of the L2 frequency band. Line 612 represents the signal of the G2 frequency band. Line 614 represents the signal from the E2 frequency band and line 616 represents the signal from the E5 frequency portion. The sampling clock is delayed by the delay circuit 578 (FIG. 5B), as described, in such a manner that the samples are obtained near the end 605 of the duration of each pulse 603, for example. This allows the signal to settle after the "ringing" (illustrated by the curve portion 607 of curve 604), which occurs just after that signal is selected by the multiplexer. As will be apparent from FIG. 6 the samples are obtained such that the samples of the multiplexed signal correspond to each individual frequency band portion of the composite signal.

Depending upon the actual frequencies involved, if may be necessary or desirable to provide one or more additional downconverter stages such as the downconverter stage 560. In this case, several of the closer frequency band signal portions be filtered in a manner that a first set of signals having frequencies falling within a first selected range, are sent to a first downconverter stage, and a second set signals having frequencies falling within a second range are sent to a second downconverter stage. This may be needed for example, for the Russian Glonass signals which have a signal frequency that is substantially different from the United States and European signal structures.

Tunable filters provided with different pass bands to appropriately filter the IF signals from the various downconverter stages or stages as needed in a particular application of the invention. As noted, in other circumstances, the whole band can be sampled is and the digitized counterparts can be transmitted to the signal processor where noise is removed and the information is processed as desired in a particular application of the invention.

Another embodiment of the invention relates to a GPS receiver that incorporates a Controlled Reception Pattern Antenna (CRPA). By way of background, a satellite signal can be quite susceptible to intentional and unintentional jamming signals due to the low power of the received signal on the surface of the earth. Sometimes in order to remove the jammer, spatial filtering is used by means of null-steering with a phased array antenna known as a controlled reception pattern antenna.

Conventional CRPA antennas are based on a process of vector channel information from each antenna element. Often times, there are seven antenna elements. The number of RF channels equals the number of antenna elements, with the exception that one local oscillator is tied to all channels because all of the signals are essentially the same frequency but at a different phase for a phased array.

Figure 7:
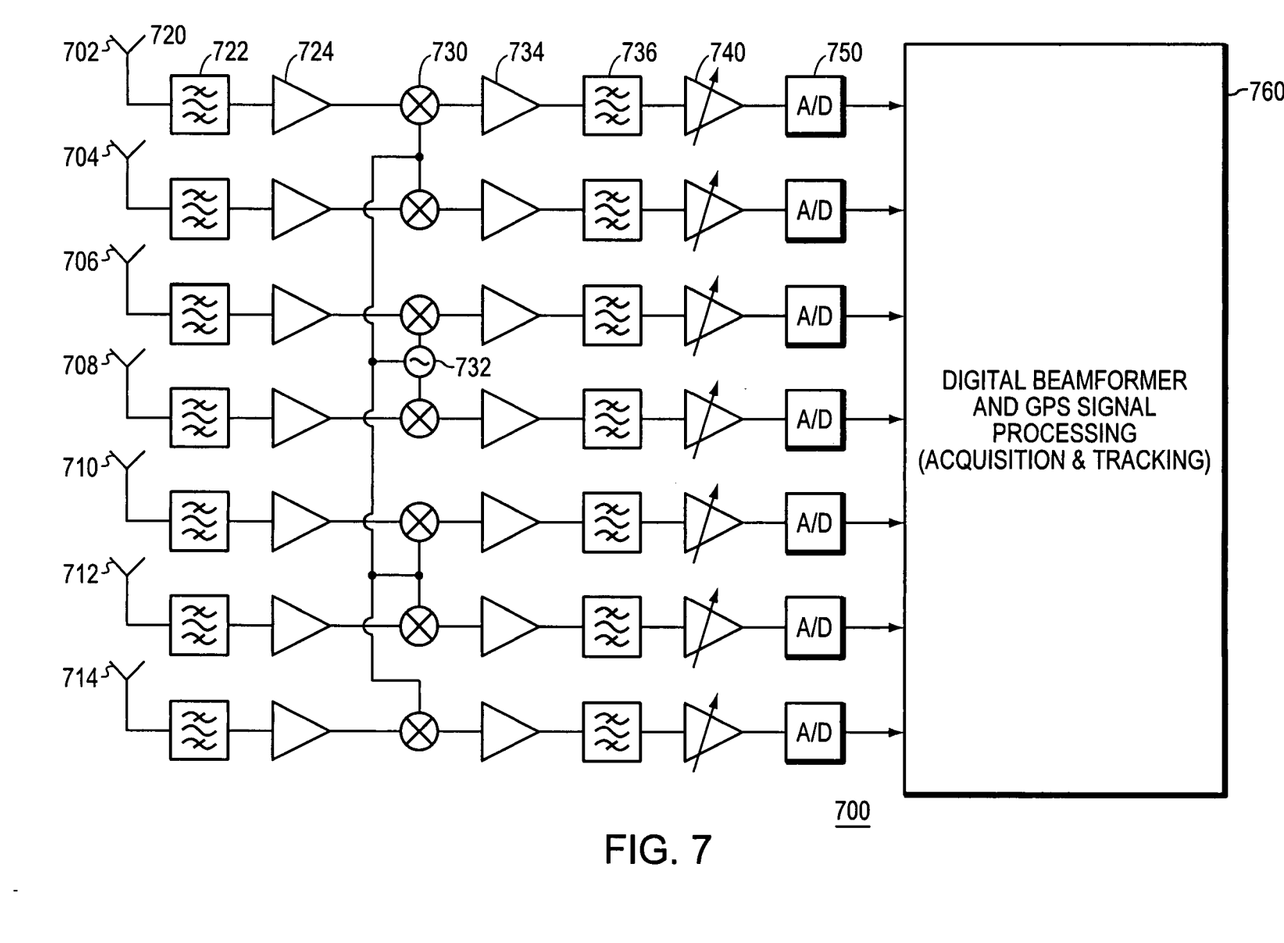
FIG. 7 is prior art Controlled Reception Pattern Antenna circuitry for receiving L1 signals on a number of antenna elements in a phased array.

For example, in the prior art version of FIG. 7, the receiver 700 has antenna elements 702 through 714. Each antenna element has (traditionally) its own RF channel, as tied to a single local oscillator 732. The antenna element 702, for example, has the RF channel 720, which includes a low pass filter 722, amplifier 724, the mixer 730, amplifier 734 and filter 736. The automatic gain control device 740 compensates for any signal strength variation prior to sampling by A/D converter 750. The digital samples thus obtained from the antenna element 702 are then provided to a digital beam former and GPS signal processing device 760 that operates in manner known to those skilled in the art.

Each antenna element 702 through 714 has a similar set of RF channel components thus resulting in a somewhat complex receiver device 700.

Figure 8:
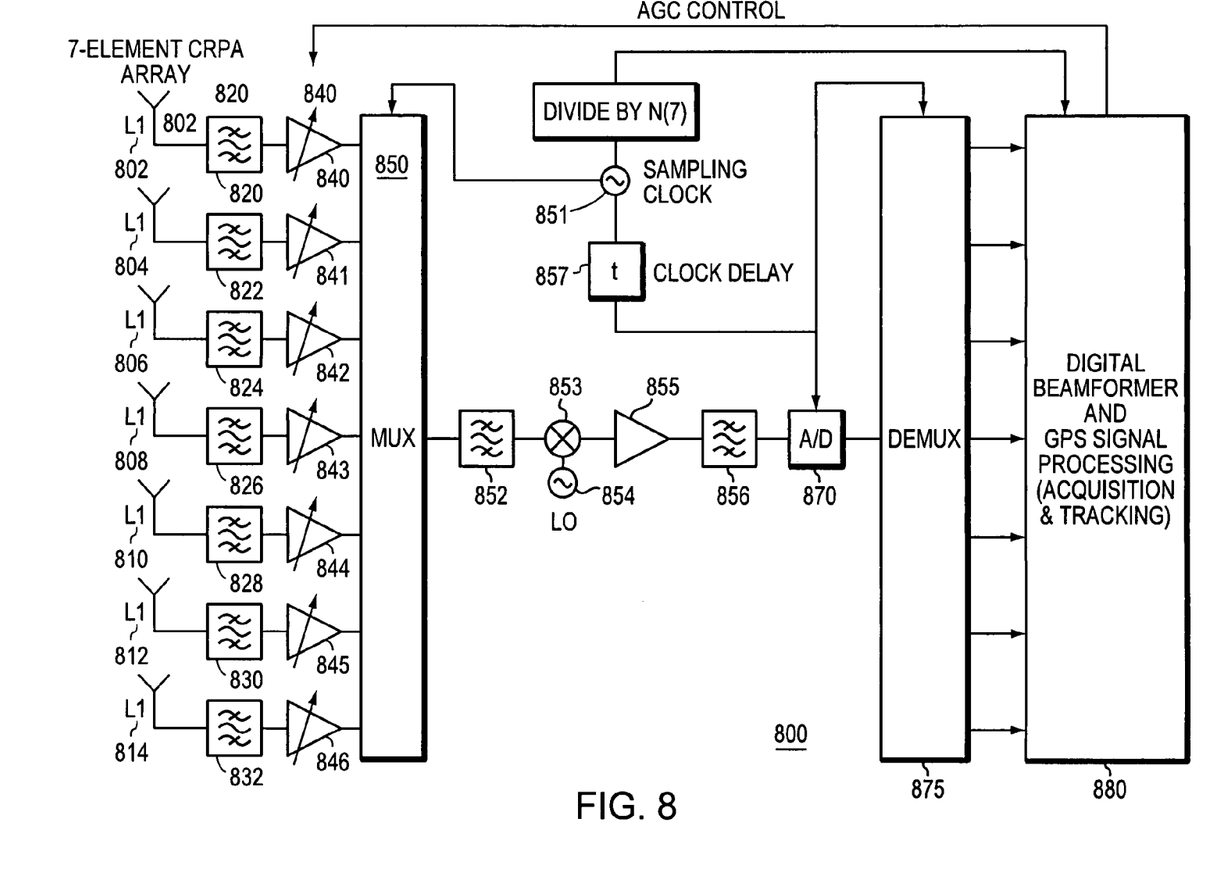
FIG. 8 is a simplified Controlled Reception Pattern Antenna receiver in accordance with the present invention.

In order to address and provide a solution to this complexity, the present invention provides a simplified receiver 800, which is illustrated in FIG. 8. The receiver 800 is used with antenna elements 802 through 814. The incoming signals at each antenna element are filtered using front end filters 820 through 832 as shown in FIG. 8 to band limit the is amount of noise entering the receiver 800, and secondly, to filter out-of-band interference and jamming signals. More specifically, the signal received at antenna element 802 is filtered by the filter 820, and is adjusted for variations in signal strength by the automatic gain control device 840. Similarly, antenna elements 804 through 814 are connected to filters 822 through 832, respectively and to automatic gain control devices 841 through 846, respectively. The filtered and adjusted signals are then passed to multiplexer 850, which is controlled by the sampling clock 851.

The sampling clock operates at a rate as defined herein, i.e., sampling clock frequency=2*BW*N. In the example of FIG. 8, the bandwidth may be 2 MHz, (and hence the filters 820 through 832 will have a bandwidth of 2 MHz) thus the sampling clock frequency is 2*2*7=28 MHz. Thus the multiplexer switches the signals appropriately to produce a composite analog signal having portions representative of the signals from each antenna element. This multiplexed analog signal is then sent to a single RF channel, which performs the appropriate heterodyning process beginning with filtering with filter 852. It should be noted that the minimum bandwidth of the RF filter 852 and the IF filter 856 shall be a minimum of 28 MHz, as determined above. This is so that the filters will at least substantially match the multiplexing switching speed, which is also the sampling speed. The filters need this wider bandwidth in order to quickly respond to the transition speed of the multiplexer, otherwise the filter may filter out the time domain response too slowly. The mixer 853 and local oscillator 854 transfer the multiplexed signal from its carrier frequency to an intermediate frequency IF. This IF signal is then amplified using the amplifier 855, and is filtered with filter 856. Digital samples are then obtained using the A/D converter 870 under the control of the sampling clock 851, but which is delayed by the delay circuit 857 to allow for signal propagation delays.

The digitized samples are then provided to demultiplexer 875 and then individual signal counterparts are passed to beam former and GPS signal processing device 880 according to the sampling clock divided by N, (in this case, N is 7).

Figure 9:
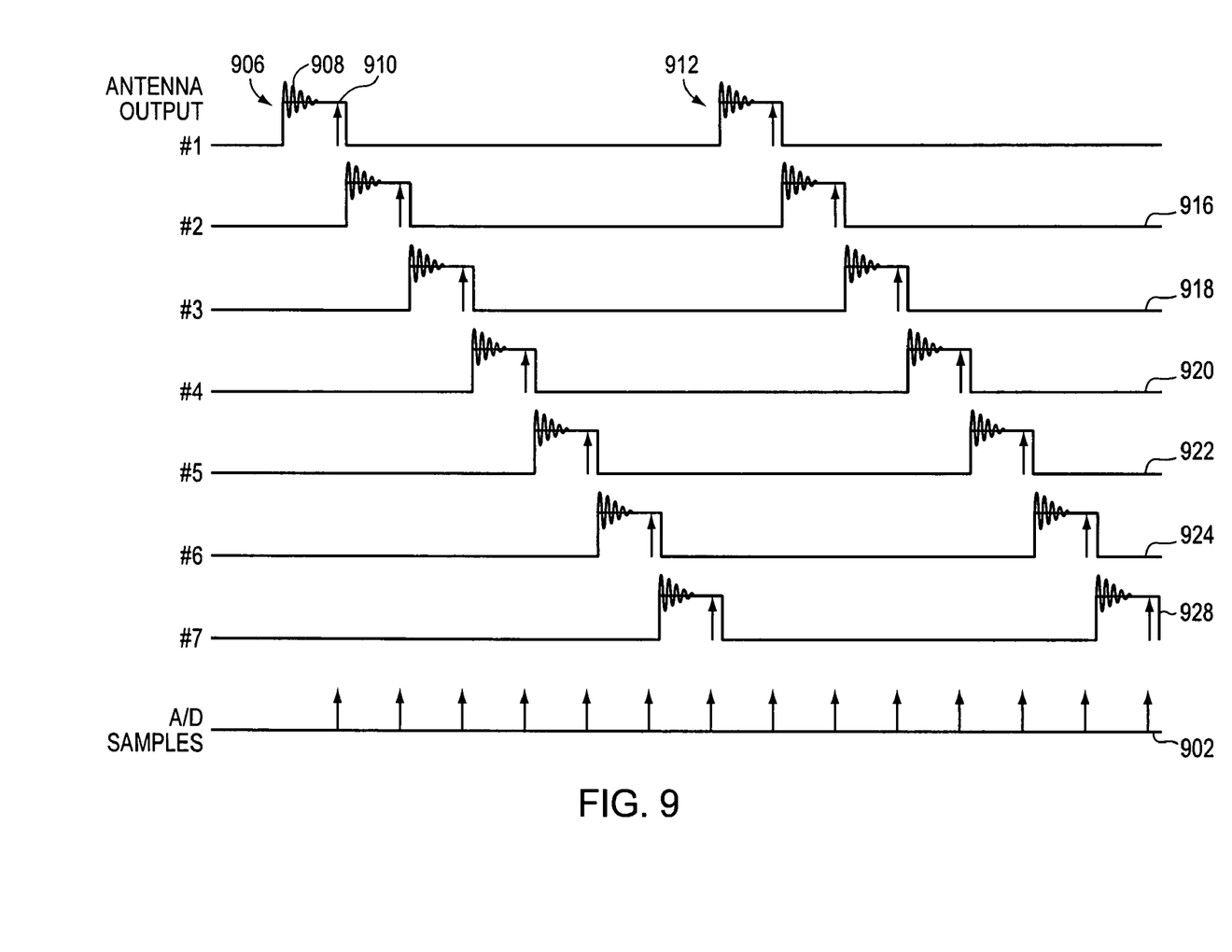
FIG. 9 is a parallel time domain sampling process timing diagram for the circuit of FIG. 8.

The timing diagram for the device 800 of FIG. 8 is illustrated in FIG. 9. The samples from the antenna elements 802 through 814 correspond with the A/D samples taken as shown at line 902 of FIG. 9. The multiplexer output signal corresponding to the antenna element 802 is shown by the curve 904. When the multiplexer switches that signal on, this is illustrated by the pulse 906. There is a ringing effect due to the switching of the multiplexer and this is illustrated by the curve portion 908. In accordance with the invention, the sample is taken towards the end of the pulse 910. The multiplexer then switches on the signal from antenna element 804, as shown by the pulse 914, of the curve 916 sequentially switches each signal on, as illustrated by the curves 918 through 928, for each remaining antenna element, 804 through 814.

It should be understood that the devices of the present invention provide simplified architectures for receivers used with antennas associated with transmission of satellite signals and are particularly useful when a number of signals are to be processed by the receiver. The simplified architectures provide reduced complexity and space savings on the associated circuit within the receiver. It should be understood by those skilled in the art that the techniques of the invention can varied and adapted for various applications of the invention, for example, certain aspects of the receiver can be adapted to process a composite signal, or instead to process the various signal structures individually, and the techniques of the invention that are implemented in the analogue portion of the circuit, can instead be implemented using digital counterparts of the signal, while remaining within the scope of the invention.

The foregoing description has been limited to a specific embodiment of the invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A receiver for decoding a composite signal consisting of a plurality of frequency bands, the receiver comprising:
   a multiplexer coupled with an antenna for receiving as inputs, incoming signals in two or more frequency bands, said multiplexer, operating at a frequency of a sampling clock, producing a composite analog multiplexed signal from said incoming signals;
   a single radio frequency (RF) stage coupled to the output of said multiplexer for receiving said a composite analog multiplexed signal said RF stage further comprising a heterodyning mixer for converting the composite analog multiplexed signal to a single intermediate frequency band signal using a fixed local oscillator that is at a frequency that is between the overall frequency range of the incoming signals; and
   a sampling circuit, for sampling the single intermediate frequency band signal, having one or more A/D converters and a demultiplexer for obtaining digitized samples and demultiplexing counterparts representing said incoming signals under the direction of the sampling clock, wherein the sampling clock frequency satisfying the Nyquist criteria.

2. The receiver as defined in claim 1 further comprising an associated signal processing device to process the incoming signals.

3. The receiver as defined in claim 1 wherein said frequency bands are the L1 and L2 frequency bands of the United States Global Positioning System.

4. The receiver as defined in claim 1 wherein the frequency bands represent frequencies from one or more different satellite systems including the European Galileo system and the Russian Federation Glonass system.

5. A receiver associated with a controlled reception pattern antenna having a number of antenna elements in a phased array, the receiver comprising:
   a plurality of antenna elements each coupled to a multiplexer, said multiplexer producing a multiplexed composite signal which is comprised of information from each individual antenna element, wherein the multiplexer operating at a frequency of a sampling clock;

a single radio frequency (RF) stage for down converting said multiplexed composite signal to a single intermediate frequency signal having one or more portions falling within a desired intermediate frequency range using a fixed local oscillator that is at a frequency that is between the overall frequency range of the incoming signals;

a sampling circuit including a demultiplexer, said sampling circuit being adapted to sample the single intermediate frequency signal and further to produce digitized samples of incoming signals, said sampling circuit having a sampling clock associated therewith wherein the sampling clock frequency satisfies the Nyquist criteria; and a digital beam former and GPS signal processing device coupled to receive the outputs of said sampling circuit and a clocking signal having a timing associated with said sampling clock.

6. The receiver as defined by claim 5 further comprising an automatic gain control circuit associated with the input from each antenna element.

7. A method of processing a signal in a satellite receiver, including the steps of:
   A) receiving from an antenna, a signal having a first frequency band portion and a second frequency band portion;
   B) multiplexing said first frequency band portion and said second frequency band portion together to form a multiplexed signal, said multiplexing operating at a frequency of a sampling clock;
   C) adjusting the strength of each of said first and second frequency band portions;
   D) down converting said multiplexed signal using a fixed local oscillator that is at a frequency that is between the overall frequency range of said frequency bands, and a mixer to generate a single multiplexed intermediate frequency signal;
   E) sampling said single multiplexed intermediate frequency signal signal using an A/D converter operating in accordance with the sampling clock to generate samples of said single multiplexed intermediate frequency signal that satisfy the Nyquist criteria of both the first and second frequency band portions;
   F) demultiplexing said samples of said single multiplexed intermediate frequency signal and performing signal processing thereon to generate individual signals for the receiver from said different frequency bands.

8. The method as defined in claim 7 wherein sampling step is at a rate that is N times a rate of said signal processing, where there are N incoming signals multiplexed together.

9. A method of processing signals received by a satellite receiver, including the steps of:
   A) receiving from an antenna, multiple incoming signals each having different signal structures;
   B) multiplexing said incoming signals to form a multiplexed composite signal, said multiplexing operating at the frequency of a sampling clock;
   C) down converting said multiplexed composite signal using a fixed local oscillator that is at a frequency that is between the overall frequency range of the incoming signals and a mixer to generate a single multiplexed intermediate frequency signal;
   D) demultiplexing the single multiplexed intermediate frequency signal;
   E) providing a demultiplexed signal representation of each incoming signal of each different signal structure to a dedicated individual A/D converter for that signal structure that produces samples of each said incoming signal, wherein the sampling operates in accordance with the sampling clock and satisfies the Nyquist criteria; and
   F) providing samples of each said incoming signal to an associated digital signal processor.

10. The method as defined in claim 9 including the further step of providing a filter for each demultiplexed signal portion to filter undesired signals prior to passing the signal portion to its dedicated A/D converter.

11. The receiver as defined in claim 1 wherein the mixer converts the composite signal by mixing the composite signal with a signal having a frequency that is approximately halfway between the input frequency bands of the incoming signals.

12. The receiver as defined in claim 1 wherein the mixer converts the composite signal by mixing the composite signal with a signal having a frequency that is within an overall frequency range of the incoming signals.

13. The receiver as defined in claim 5 wherein the sample clock is delayed so that the digitized samples of the incoming signals are obtained near the ends of pulses associated with the multiplexed composite signal.

14. The method as defined in claim 7 wherein a signal produced by the local oscillator is selected to be a frequency that is approximately half way between the first frequency band portion and the second frequency band portion.

15. The method as defined in claim 9 wherein a signal produced by the local oscillator is selected to be a frequency that is approximately half way between the incoming signal frequencies.

16. The method as defined in claim 9 wherein the signal produced by the local oscillator is selected to be a frequency that is within an overall frequency range of the multiple incoming signals.

* * * * *